(No Model.)

J. S. MATHEWS & A. T. DOYLE.
ROTARY FLANGER AND TRACK CLEARER.

No. 527,756. Patented Oct. 16, 1894.

Witnesses
M. E. Fowler
James R. Mansfield.

Inventors
John S. Mathews
Albert T. Doyle
by Alexander & Dowell
Attorneys

UNITED STATES PATENT OFFICE.

JOHN S. MATHEWS AND ALBERT T. DOYLE, OF PENDLETON, ASSIGNORS OF ONE-FOURTH TO JESSE F. KILLGORE, OF WESTON, OREGON.

ROTARY FLANGER AND TRACK-CLEARER.

SPECIFICATION forming part of Letters Patent No. 527,756, dated October 16, 1894.

Application filed March 31, 1894. Serial No. 505,888. (No model.)

*To all whom it may concern:*

Be it known that we, JOHN S. MATHEWS and ALBERT T. DOYLE, of Pendleton, in the county of Umatilla and State of Oregon, have invented certain new and useful Improvements in Rotary Flangers and Track-Clearers; and we do hereby declare that the following is a full, clear, and exact description thereof, reference being had to the accompanying drawings, and to the letters of reference marked thereon, which form part of this specification.

This invention is an improved track clearer or rotary flanger for cutting ice from the rails of railroad-tracks, and it consists in the novel combination and construction of parts hereinafter described and claimed.

Figure 1:
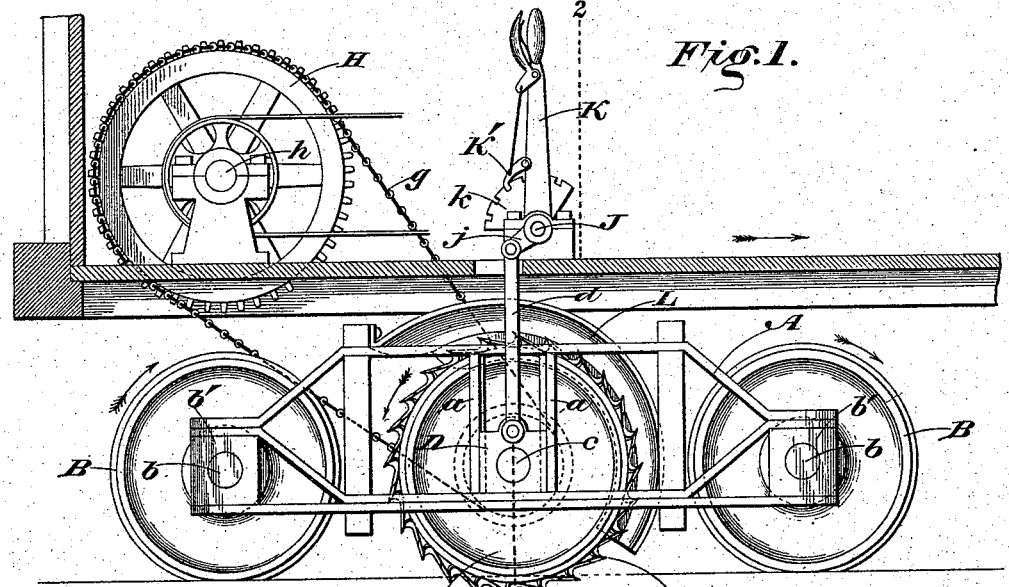
Figure 2:
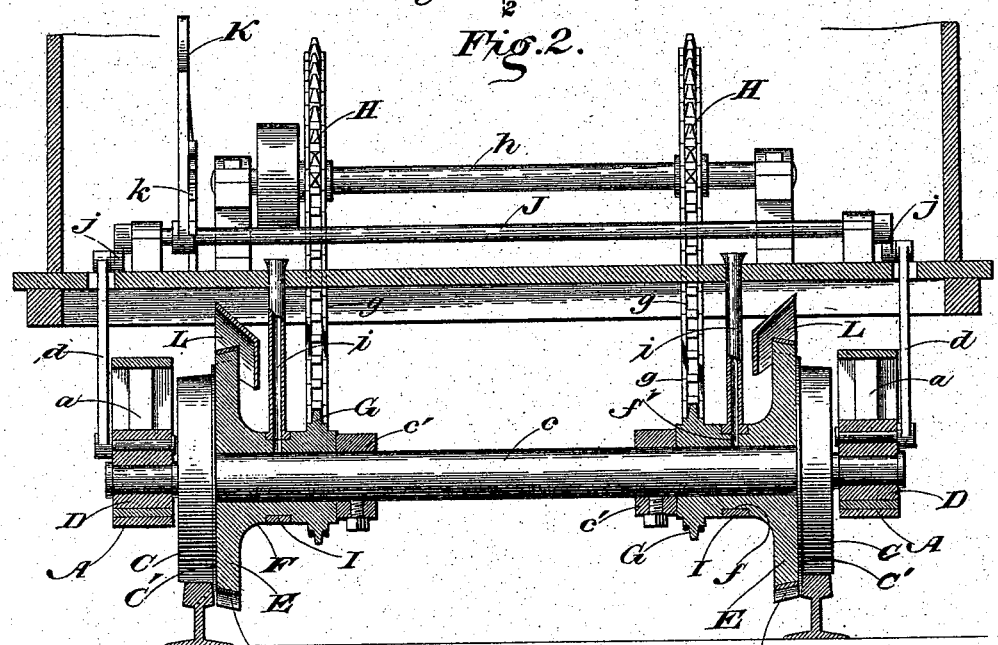
Figure 3:
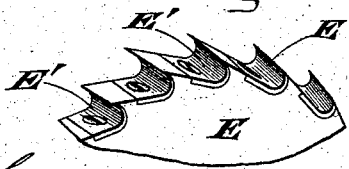

Referring to the accompanying drawings:—Figure 1 represents a side elevation of a railroad car-truck, embodying the invention. Fig. 2 is a vertical transverse section through the same on line 2—2 Fig. 1. Fig. 3 is a detail perspective view of one of the rotary cutters.

A designates a truck frame of any suitable construction, preferably what is known as a "six wheel" truck frame. It is carried however by the outer pairs of wheels B, B, fixed on axles $b$, $b$, journaled in boxes $b'$ arranged as in ordinary truck construction. The intermediate wheels C are fixed on an axle $c$, which is journaled in boxes D, that are vertically adjustable, and are guided between uprights $a$, $a$, of the sides of truck frame, but have no horizontal motion on the frame, in any direction. The wheels C, may be like the others, excepting that their flanges C' are made quite thin and narrow; and in some cases their flanges might be omitted altogether, but are preferably retained, reduced as shown, not to keep the wheels on the rails, but to serve as guards to prevent the rotary cutters from striking the track rails.

A rotary cutter or "flanger" E is mounted on the axle $c$, at the inner side of each wheel C, said cutters being fastened to, or formed with, hubs F, which are loosely journaled on the axle $c$, intermediate wheels C, and are prevented from moving longitudinally thereon by adjustable collars $c'$ secured on the axle as shown. On these hubs are also formed or secured pulleys, sprockets, or gears, by which motion can be transmitted to the hub and cutters from any suitable driving power. As shown sprockets G are secured on the hubs, and driven by sprocket chains $g$ from sprockets H on a driving shaft $h$, mounted on the car body, above the truck, and driven by any suitable power, as by an engine on the car. We do not confine ourselves to the specific mechanism for rotating the cutters.

Intermediate the sprockets and cutters, bands I are fitted closely but loosely around the hubs, in annular recesses $f$ therein, and in this portion of the hub are a series of radial perforations $f'$, through which oil is conducted to the journal of the hub, said oil being supplied through pipes $i$, $i$, connected with the bands and leading up into the body of the car, as shown.

It will be observed that the cutters are independent of each other, and that they rotate on the axle that carries the wheels C', which latter act as guides for the cutters both to regulate the depth of their cut, and to prevent contact thereof with the rails. Furthermore the cutters are vertically adjustable with the wheels C and axle, which can be raised by means of pitmen $d$, connected to crank arms $j$ on a rock shaft J, journaled on the car body or other suitable place, and operated by means of a lever K which may be provided with a hand latch K' and locked by the engagement thereof with a fixed segment $k$; or other suitable means for locking the rock shaft can be used.

The cutters are provided with a toothed periphery, each tooth E' being detachable and replaceable, and fitted in suitable recesses in the edge of the cutter disk, and secured thereto by bolts or screws, as shown, or in other secure manner. The edges of the teeth are transversely beveled so that their inner corners are farther from the axle than their outer corners as shown, so that when the cutters are at work the ice cut by the teeth will be ejected laterally from beneath the truck by the action of the teeth, and any ice thrown upward by them instead of striking the car bottom is deflected outward by shields L, arranged over the "up" side of the cutters as shown.

In operation the truck should be moved in a direction contrary to the rotation of the cutters, which are driven at a high speed contrary to the rotation of wheels C. They cut the ice from the rails close to the heads thereof. Wheels C do not carry any weight of car body, in the construction shown, but simply carry and regulate the cutting of the flangers. When running over cleared tracks, switches, &c., the axle $c$ is raised, so the cutters will not be injured.

By arranging the cutters upon the axle of the intermediate truck wheels they can be adjusted to cut very close to the rails, the wheels will regulate the depth of cut, and there is less danger of derailment of the car, as while the cutters follow one pair of wheels they accompany another, and precede the third, insuring a clear track for the latter.

Having thus described our invention, what we claim as new, and desire to secure by Letters Patent thereon, is—

1. The combination with a car axle, and wheels thereon of rotary cutters journaled upon the axle beside the wheels, and mechanism for rotating said cutters upon the axle, substantially as described.

2. The combination with a car axle, and wheels thereon, having thin and shallow flanges, of rotary cutters journaled on the axle at the inner sides of the wheels, and mechanism for rotating said cutters on the axle, substantially as specified.

3. The combination with a wheeled car truck, of rotary cutters journaled on one of the truck axles to the inside of the wheels, and mechanism for rotating said cutters on the axle, substantially as set forth.

4. The combination with a six-wheeled car truck, of rotary cutters journaled on the intermediate axle to the inside of the wheels, and mechanism for rotating said cutters, substantially as described.

5. The combination of the vertically adjustable axle, the wheels fixed thereon, the rotary cutters journaled on said axle beside the wheels and adjustable therewith and mechanism for rotating said cutters on the axle, substantially as specified.

6. The combination of the rotary cutter, having an annular recess, and radial perforations; its support, and mechanism for rotating it; with the annular band seated in said recess, and means for supplying oil to said recess, substantially as set forth.

7. The combination with a car axle and wheels thereon, the rotary hubs journaled upon the axle, the cutters carried by said hubs, and means for supplying oil to the interior of the hubs, substantially as described.

8. The combination with a car axle, and wheels fixed thereon, the rotary hubs journaled on said axle to the inside of the wheels, the cutters fixed on said hubs, the sprocket gearing for rotating the hubs, and means for adjusting said axle vertically, substantially as specified.

9. The combination with a six-wheeled car truck, the intermediate wheels and axle being vertically adjustable, of rotary cutters journaled on and adjustable with said axle, means for oiling the bearings of said cutters, and means for rotating them upon the axle, substantially as set forth.

10. The combination with a car axle, and wheels fixed thereon, the rotary hubs journaled on said axle to the inside of the wheels, the cutters fixed on said hubs, the sprocket gearing for rotating the hubs, and means for adjusting said axle vertically, and the fixed deflectors or guards arranged over the "up" side of the cutters, substantially as and for the purpose described.

11. The combination with a six-wheeled car truck, the intermediate wheels and axle being vertically adjustable, of rotary cutters journaled on and adjustable with said axle, means for oiling the bearings of said cutters, and means for rotating them upon the axle, and the fixed deflectors or guards arranged over the "up" side of the cutters, all constructed and arranged to operate substantially as and for the purpose set forth.

In testimony that we claim the foregoing as our own we affix our signatures in presence of two witnesses.

JOHN S. MATHEWS.
ALBERT T. DOYLE.

Witnesses:
WM. HILTON,
J. E. MILLER.